United States Patent
Zhang et al.

(10) Patent No.: US 11,977,929 B2
(45) Date of Patent: May 7, 2024

(54) RESOURCE ALLOCATION METHOD AND APPARATUS BASED ON EDGE COMPUTING

(71) Applicant: SHANDONG COMPUTER SCIENCE CENTER (NATIONAL SUPERCOMPUTER CENTER IN JINAN), Shandong (CN)

(72) Inventors: Wei Zhang, Shandong (CN); Huiling Shi, Shandong (CN); Xinchang Zhang, Shandong (CN); Yanling Zhao, Shandong (CN); Lu Wang, Shandong (CN); Meng Sun, Shandong (CN)

(73) Assignee: SHANDONG COMPUTER SCIENCE CENTER (NATIONAL SUPERCOMPUTER CENTER IN JINAN), Jinan (CN)

( * ) Notice: Subject to any disclaimer, the term of this patent is extended or adjusted under 35 U.S.C. 154(b) by 657 days.

(21) Appl. No.: 16/967,673

(22) PCT Filed: Feb. 20, 2020

(86) PCT No.: PCT/CN2020/077267
§ 371 (c)(1),
(2) Date: Aug. 20, 2020

(87) PCT Pub. No.: WO2020/199812
PCT Pub. Date: Oct. 8, 2020

(65) Prior Publication Data
US 2023/0176929 A1    Jun. 8, 2023

(30) Foreign Application Priority Data
Mar. 29, 2019 (CN) .......................... 201910255997.8

(51) Int. Cl.
*G06F 9/50* (2006.01)
*H04L 41/50* (2022.01)
(Continued)

(52) U.S. Cl.
CPC ........ *G06F 9/5083* (2013.01); *H04L 41/5019* (2013.01); *H04L 41/5096* (2013.01); *H04L 67/10* (2013.01); *H04L 67/289* (2013.01)

(58) Field of Classification Search
CPC .............. G06F 9/5083; H04L 41/5019; H04L 41/5096; H04L 67/10; H04L 67/289
See application file for complete search history.

(56) References Cited

U.S. PATENT DOCUMENTS

| | | | |
|---|---|---|---|
| 10,846,788 B1* | 11/2020 | Klein ....................... | H04L 47/83 |
| 2007/0147834 A1* | 6/2007 | Lai ..................... | H04Q 11/0067 |
| | | | 398/69 |

(Continued)

FOREIGN PATENT DOCUMENTS

| CN | 108494612 A | 9/2018 |
|---|---|---|
| CN | 109302709 A | 2/2019 |
| CN | 110048882 A | 7/2019 |

OTHER PUBLICATIONS

Guan et al ("Handover Minimized Service Region Partition for Mobile Edge Computing in Wireless Metropolitan Area Networks", IEEE, 2018, all pages).*

(Continued)

*Primary Examiner* — Hua Fan
(74) *Attorney, Agent, or Firm* — Bayramoglu Law Offices LLC (57) ABSTRACT

The resource allocation method and apparatus are based on edge computing. The method includes: decomposing all application systems in a server into a plurality of meta-service units according to the coupling degree between different service modules in the application systems, and obtaining the quality of experience (QoE) index parameter value of each meta-service unit; clustering the plurality of meta-service units by using a clustering algorithm based on the QoE index parameter value of each meta-service unit;

(Continued)

and allocating resources to each cluster according to the QoE index parameter values of all meta-service units in each cluster, so that all meta-service units in each cluster share the allocated resources. According to the invention, the resource allocation is more reasonable, the QoE value of a user is increased, and the resource use is more effective.

7 Claims, 3 Drawing Sheets

(51) Int. Cl.
*H04L 41/5019* (2022.01)
*H04L 67/10* (2022.01)
*H04L 67/289* (2022.01)

(56) References Cited

U.S. PATENT DOCUMENTS

2017/0085628 A1 3/2017 Banerjee et al.
2018/0109590 A1* 4/2018 Rao .................... H04L 67/289
2018/0343567 A1 11/2018 Ashrafi

OTHER PUBLICATIONS

Guan, Xinjie; Wili Wan, Feng Ye, Baek-Yohng Choi, "Handover Minimized Service Region Partition for Mobile Edge Computing in Wireless Metropolitan Area Networks" 2018 IEEE International Smart Cities Conference (ISC2), Date of Conference: Sep. 16-19, 2018, INSPEC Accession No. 18504792, DOI: 10.1109/ISC2.2018.8656951.

* cited by examiner

Obtaining meta-service units decomposed by a subtracted service module when the service module is subtracted from the server, and obtaining the cluster where the meta-service units are located — 310

Deleting the meta-service units decomposed by the subtracted service module from the cluster where the meta-service units are located — 320

Recalculating the amount of the resources to be allocated to the cluster — 330

Comparing the amount of the resources to be allocated to the cluster with the amount of the resources allocated to the cluster to obtain a second comparison result — 340

Determining whether the resources are reallocated to the cluster according to the second comparison result — 350

RESOURCE ALLOCATION METHOD AND APPARATUS BASED ON EDGE COMPUTING

TECHNICAL FIELD

The present invention relates to the field of communication technologies, and in particular, to a resource allocation method and apparatus based on edge computing.

BACKGROUND

With the development of wireless communication technology and the popularization of intelligent terminal devices, network operators and service providers are most concerned about the quality of experience (QoE) and satisfaction of the majority of wireless terminal users regarding services.

With the advent of 5G network era, a large number of application systems have come online, which raises higher demands on a resource allocation manner. If the application is completely located on a cloud server located in a core network, core return link resources are consumed, and an additional latency overhead is generated, which cannot meet the requirements of low latency and high reliability in 5G scenarios. Mobile edge computing (MEC) was firstly proposed by the European Telecommunications Standards Institute in 2014. In fact, this idea also fits the concept of an access cloud in the above 5G architecture. The MEC system allows devices to offload computing tasks to network edge nodes, such as base stations and wireless access points, thereby not only meeting the expansion needs of computing capabilities of the terminal devices, but also compensating for the shortcoming of a relatively long latency of cloud computing. The MEC quickly becomes a key technology of 5G, and is favorable to achievement of the key technical indexes such as ultra-low latency, ultra-high energy efficiency, and ultra-high reliability of 5G services. For example, for live streaming media with a higher real-time requirement, a higher link bandwidth and a lower network latency are required, the content update is more frequent, and thus a lot of storage space is required. However, in the application system of virtual reality, the update of a background service module is slow, so the required storage space is fixed, but the update of an interactive part is frequent, which requires a higher bandwidth and image processing speed. Therefore, how to carry out fine-grained resource allocation based on the QoE of a user for the application system to improve the QoE of the user and effective use of resources is still in the exploration stage.

SUMMARY

The technical problem to be solved by the present invention is to provide a resource allocation method and apparatus based on edge computing with respect to the shortcomings of prior art.

The present invention adopts the following technical solution for solving the above technical problem.

A resource allocation method based on edge computing includes:

decomposing all application systems in a server into a plurality of meta-service units according to the coupling degree between different service modules in the application systems, and obtaining the quality of experience (QoE) index parameter value of each meta-service unit;

clustering the plurality of meta-service units by using a clustering algorithm based on the QoE index parameter value of each meta-service unit, and allocating resources to each cluster according to the QoE index parameter values of all meta-service units in each cluster, so that all meta-service units in each cluster share the allocated resources.

The beneficial effects of the present invention are as follows. The application systems are decomposed into the plurality of meta-service units according to the coupling degree between the service modules in the application systems; all meta-service units are clustered based on the QoE index parameter value of each meta-service unit to obtain a plurality of clusters; and the resources are allocated to the clusters based on the QoE index parameter value of each cluster, so that all meta-service units in the same cluster share the allocated resources. Therefore, the meta-service units with similar QoE index parameter values are classified into the same cluster, resource allocation is performed in units of clusters, the fine-grained resource allocation is realized, the resource allocation is reasonable, and the QoE value of the user is increased.

Based on the above technical solution, the present invention can also be improved as follows.

Further, allocating resources to each cluster according to the QoE index parameter values of all meta-service units in each cluster specifically includes:

obtaining the QoE index parameter value of each cluster according to the QoE index parameter values of all meta-service units in each cluster;

obtaining the amount of the resources to be allocated to each cluster according to the QoE index parameter value of each cluster; and allocating the resources to each cluster according to the amount of the resources to be allocated to each cluster.

The beneficial effects of adopting the above further solution are as follows. The QoE index parameter value of each cluster are obtained according to the QoE index parameter values of all meta-service units in each cluster, and the amount the resources to be allocated to each cluster is obtained according to the QoE index parameter value of each cluster. Thus, the resource allocation is more reasonable, and the QoE value of the user is increased.

Based on the above technical solution, the present invention can also be improved as follows.

Further, obtaining the amount of the resources to be allocated to each cluster according to the QoE index parameter value of each cluster specifically includes:

converting the QoE index parameter value of each cluster into the amount of corresponding resources based on a corresponding relationship between the QoE index parameter value of each cluster and the amount of the corresponding resources to obtain the amount of the resources to be allocated to each cluster.

Further, obtaining the QoE index parameter value of each cluster according to the QoE index parameter values of all meta-service units in each cluster specifically includes:

accumulating the QoE index parameter values of all meta-service units in each cluster respectively according to QoE index parameters to obtain the QoE index parameter value of each cluster.

The beneficial effects of adopting the above further solution are as follows. Based on the corresponding relationship between the QoE index parameter value of each cluster and the amount of the resources, the QoE index parameter value of each cluster are converted into the amount of the corresponding resources. Therefore, sufficient required resources are allocated to the clusters, and resource allocation is more reasonable.

Based on the above technical solution, the present invention can also be improved as follows.

Further, the method further includes: decomposing a newly added service module into at least one meta-service unit when the new service module is added to the server, and obtaining the QoE: index parameter value of the meta-service unit, the newly added service module including a newly added application system or a newly added service module in the existing application system in the server;

classifying the meta-service unit into a corresponding cluster according to the QoE index parameter value of the meta-service unit;

recalculating the amount of the resources to be allocated to the cluster;

comparing the amount of the resources to be allocated to the cluster with the amount of the resources allocated to the cluster to obtain a first comparison result; and determining whether to reallocate the resources to the cluster according to the first comparison result.

Further, the method further includes: if the first comparison result is that the amount of the resources to be allocated to the cluster is greater than the amount of the resources allocated to the cluster, reallocating the resources to the cluster;

otherwise, no reallocation of resources is performed to the cluster.

The beneficial effects of adopting the above further solution are as follows. When the new service module is added to the server, the newly added service module is decomposed into the meta-service units, and these meta-service units are classified into corresponding, clusters; the amount of the resources to be allocated to the clusters is recalculated and compared with the amount of allocated resources; and thus it is determined whether to reallocate the resources. Therefore, when there is a service change, by recalculating the amount of the resources to be allocated to the clusters and comparing the amount of the resources to be allocated to the clusters with the amount of allocated resources, it is determined whether the resources need to be reallocated, thereby improving the utilization rate of the resources and increasing the QoE value of the user.

Based on the above technical solution, the present invention can also be improved as follows.

The method further includes: obtaining the meta-service units decomposed by a subtracted service module when the service module is subtracted from the server, and obtaining the cluster where the meta-service units are located, the subtracted service module including a subtracted application system or a subtracted service module of the existing application system in the server;

deleting the meta-service units decomposed by the subtracted service module from the cluster where the meta-service units are located respectively;

recalculating the amount of the resources to be allocated to the cluster;

comparing the amount of the resources to be allocated to the cluster with the amount of the resources allocated to the cluster to obtain a second comparison result; and determining whether to reallocate the resources to the cluster according to the second comparison result.

Further, the method further includes: if the second comparison result is that the amount of the resources to be allocated to the cluster is greater than the amount of the resources allocated to the cluster, reallocating the resources to the cluster;

otherwise, no reallocation of the resources is performed to the cluster.

The beneficial effects of adopting the above further solution are as follows. When the service module is subtracted from the server, the meta-service units decomposed by the subtracted service module are deleted from the cluster where the meta-service units are located respectively; the QoE index parameter value of the cluster are recalculated; the amount of the resources to be allocated to the cluster is obtained through the QoE index parameter value of the cluster; the amount of the resources to be allocated to the cluster is compared with the amount of the resources allocated to the cluster; and it is determined whether to reallocate the resources. Thus, the utilization rate of the resources is improved.

The present invention adopts another following technical solution for solving the above technical problem.

A resource allocation apparatus based on edge computing includes:

an initializing module configured to decompose all application systems in a server into a plurality of meta-service units according to the coupling degree between different service modules in the application systems, and obtain the QoE index parameter value of each meta-service unit;

a clustering module configured to cluster the plurality of meta-service units by using a clustering algorithm based on the QoE index parameter value of each meta-service unit; and an allocating module configured to allocate resources to each cluster according to the QoE index parameter values of all meta-service units in each cluster, so that all meta-service units in each cluster share the allocated resources.

The beneficial effects of the present invention are as follows. The resource allocation apparatus includes the decomposing module, the calculating module and the allocating module. The application systems are decomposed into the plurality of meta-service units, all meta-service units are clustered based on the QoE index parameter value of each meta-service unit to obtain a plurality of clusters, and the resources are allocated to the clusters based on the QoE index parameter value of each cluster, so that all meta-service units in the same cluster share the allocated resources. Therefore, the meta-service units with similar QoE index parameter values are classified into the same cluster, resource allocation is performed in units of clusters, the fine-grained resource allocation is realized, the resource allocation is reasonable, and the QoE value of the user is increased.

In addition, the present invention further provides a storage medium having an instruction stored therein, which, when being read by a computer, causes the computer to execute a resource allocation method based on edge computing in the above technical solution.

The advantages of additional aspects of the present invention will be partially given in the following description, and some advantages will become apparent from the following description, or be learned through the practice of the present invention.

BRIEF DESCRIPTION OF THE DRAWINGS in order to describe the technical solutions in embodiments of the present invention more clearly, the following briefly introduces the accompanying drawings required for describing the embodiments of the present invention or the prior art. Apparently, the accompanying drawings in the following description show merely some embodiments of the present disclosure, and a person of ordinary skill in the art may also derive other drawings from these accompanying drawings without creative efforts.

DETAILED DESCRIPTION

The technical solutions in the embodiments of the present invention will be clearly and completely described below in conjunction with the accompanying drawings in the embodiments of the present invention. It is obvious that the described embodiments are only part but not all of the embodiments of the present invention. AH other embodiments obtained by those skilled in the art without creative efforts based on the embodiments in the present invention are within the protection scope of the present invention.

Figure 1:
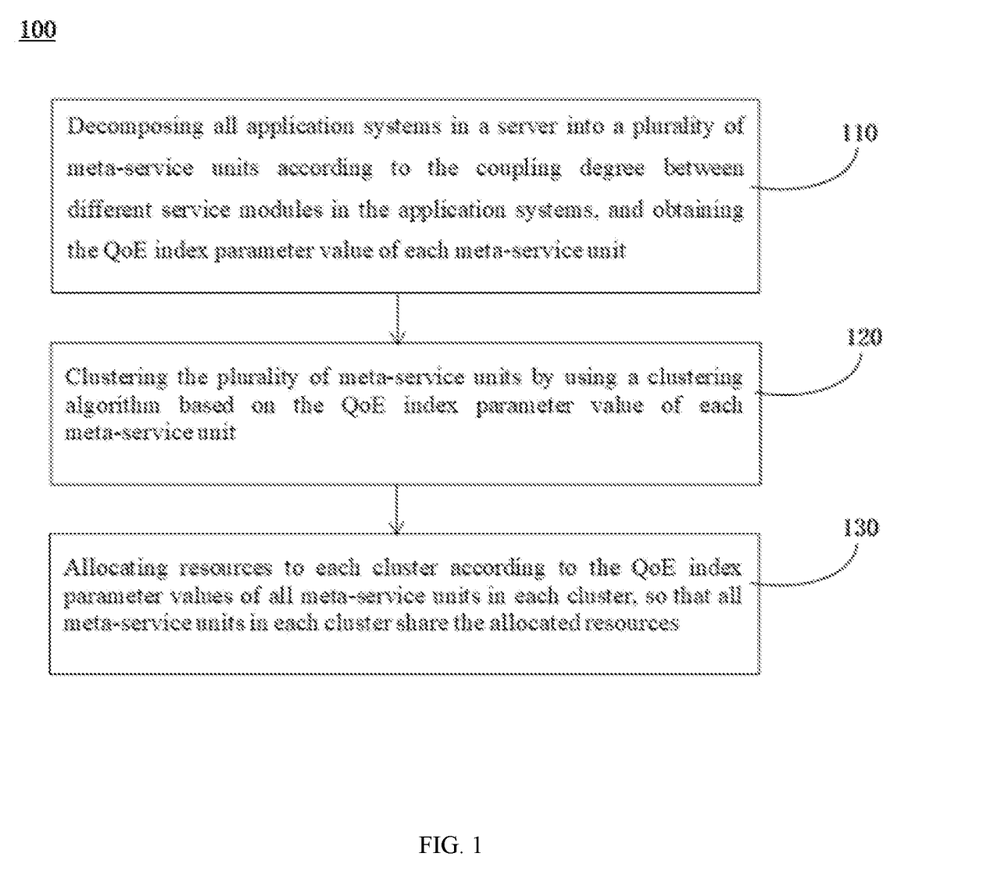
FIG. 1 is a schematic flowchart of a resource allocation method based on edge computing according to an embodiment of the present invention.

As shown in FIG. 1, a resource allocation method 100 based on edge computing includes the following steps.

In step 110, according to the coupling degree between different service modules in application systems, all application systems in a server are decomposed into a plurality of meta-service units, and the QoE index parameter value of each meta-service unit is obtained.

It should be understood that the coupling degree between different service modules in the application systems in the present embodiment may be any coupling degree of message coupling, data coupling, feature coupling, control coupling, external coupling, and common coupling according to the coupling degree from low to high, which is not limited in the embodiment of the present invention. Different coupling degrees may be used according to actual applications. The QoE index parameter is the presentation of user own feelings. The QoE index parameter includes a latency, a packet loss rate, a frame rate, a processing speed, a bandwidth and the like, which is not limited in the embodiment of the present invention, and the QoE index parameter can be determined according to the application system in actual application.

In step 120, based on the QoE index parameter value of each meta-service unit, the plurality of meta-service units is clustered by using a clustering algorithm.

It should be understood that the clustering algorithm is adopted in the present embodiment, wherein the specific clustering algorithm is not limited, and the meta-service units having similar QoE index parameter values are classified into one cluster to obtain plurality of clusters.

In step 130, resources are allocated to the cluster based on the QoE index parameter values of all meta-service units in each cluster, so that all meta-service units in each cluster share the allocated resources.

The beneficial effects of the embodiment of the present invention are as follows. The application systems are decomposed into the plurality of meta-service units according to the coupling degree between the service modules in the application systems; all meta-service units are clustered based on the QoE index parameter value of each meta-service unit to obtain the plurality of clusters; and the resources are allocated to the cluster based on the QoE index parameter value of each cluster, so that all meta-service units in the same cluster share the allocated resources. Therefore, the meta-service units with similar QoE index parameter values are classified into the same cluster, resource allocation is performed in units of clusters, the fine-grained resource allocation is realized, the resource allocation is reasonable, and the QoE value of a user is increased.

Based on the above embodiment, in a preferred embodiment, step 130 includes obtaining the QoE index parameter value of each cluster according to the QoE index parameter values of all meta-service units in each cluster;

according to the QoE index parameter value of each cluster, obtaining the amount of the resources to be allocated to each cluster; and according to the amount of the resources to be allocated to each cluster, allocating the resources to each cluster.

Based on the above embodiment, according to the QoE index parameter value of each cluster, obtaining the amount of the resources to be allocated to each cluster specifically includes:

based on a corresponding relationship between the QoE index parameter value of each cluster and the amount of corresponding resources, converting the QoE index parameter value of each cluster into the amount of the corresponding resources to obtain the amount of the resources to be allocated to each cluster.

In the present embodiment, the corresponding relationship between the QoE index parameter value of each cluster and the amount of the corresponding resources means that for example, if there is a bandwidth index in the QoE index parameter value, the corresponding resource is the bandwidth. For example, if the bandwidth of SUM/s can bring a better QoE value to the user, the amount of the bandwidth resource to be allocated corresponding to the bandwidth of 50 M/s is 50 M/s.

Based on the above embodiment, according to the QoE index parameter values of all meta-service units in each cluster, obtaining the QoE index parameter value of each cluster specifically includes:

accumulating the QoE index parameter values of all meta-service units in each cluster respectively according to QoE index parameters to obtain the QoE index parameter value of each cluster.

In the present embodiment, there are many manners to calculate the QoE index parameter value of the cluster. In the present embodiment, the calculation manner of accumulating the same type of QoE index parameter values is adopted. For example, the bandwidth in the QoE index parameter value of a meta-service unit 1 in the cluster is 50 M/s, and the bandwidth in the QoE index parameter value of a meta-service unit 2 in the cluster is 65 M/s, so the bandwidth in the QoE index parameter value of the cluster is 115 M/s. Of course, different calculation methods may be selected according to specific practical applications. The embodiment of the present invention is only an example, and makes no limitations.

Figure 2:
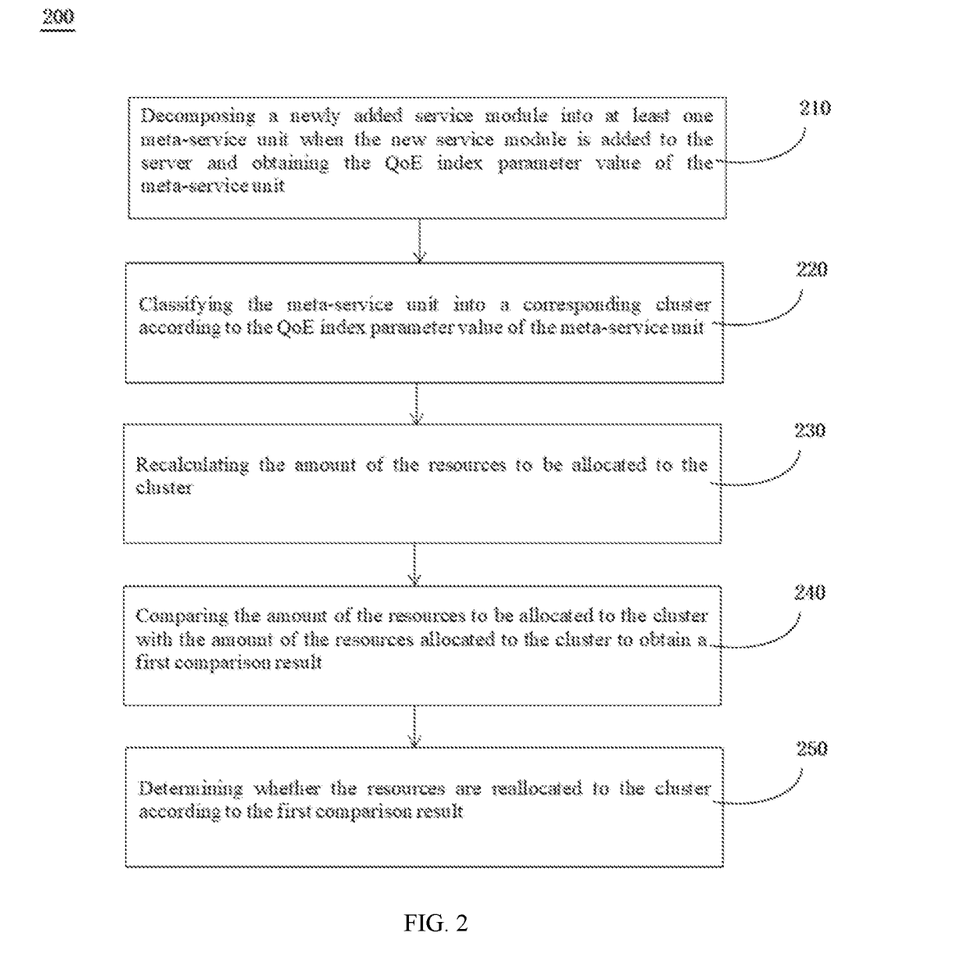
FIG. 2 is a schematic flowchart of a resource allocation method based on edge computing according to another embodiment of the present invention.

FIG. 2 shows a resource allocation method 200 based on edge computing according to the resource allocation method 100 based on edge computing. The resource allocation method 200 includes the following steps.

In step 210, when a new service module is added to the server, the newly added service module is decomposed into at least one meta-service unit, and the QoE index parameter value of the meta-service unit is obtained.

The newly added service module in the present embodiment includes a newly added application system in the server or a newly added service module in the installed application system in the server.

In step 220, according to the QoE index parameter value of the meta-service unit, the meta-service unit is classified into the corresponding cluster.

In step 230, the amount of the resources to be allocated to the cluster is recalculated.

In step 240, the amount of the resources to be allocated to the cluster is compared with the amount of the resources allocated to the cluster to obtain a first comparison result.

In step 250, according to the first comparison result, it is determined whether to reallocate the resources to the cluster.

In the present embodiment, according to the QoE index parameter value of the meta-service unit, the meta-service unit is classified into the cluster with the similar index parameter value, and the specific classifying algorithm is not limited in the present embodiment.

The beneficial effects of the embodiment of the present invention are as follows. When the new service module is added to the server, according to the coupling degree between the newly added service module and the existing service module, the newly added service module is decomposed into meta-service units, and these meta-service units are classified into corresponding clusters; the amount of the resources to be allocated to the cluster is recalculated, and compared with the amount of allocated resources; and if the amount of allocated resources is consistent with the amount of the resources required by the cluster, no reallocation of resources is performed to the cluster. By fine-grained resource allocation, when there is a service change, it can be more reasonably determined whether the resources need to be reallocated. Thus, the utilization rate of the resources is improved, and the QoE value of the user is also increased.

Based on the above embodiment, step 250 may include:

if the first comparison result is that the amount of the resources to be allocated to the cluster is greater than the amount of the resources allocated to the cluster, reallocate the resources to the cluster.

Otherwise, no reallocation of resources is performed to the cluster.

In the present embodiment, when the amount of the resources allocated to the cluster is less than the amount of required resources, that is, when the amount of the resources allocated to the cluster is not consistent with the amount of required resources, it is necessary to reallocate the resources to the duster. Otherwise, when the amount of the resources allocated to the cluster is consistent with the amount of required resources, there is no need to reallocate resources to the cluster.

Figure 3:
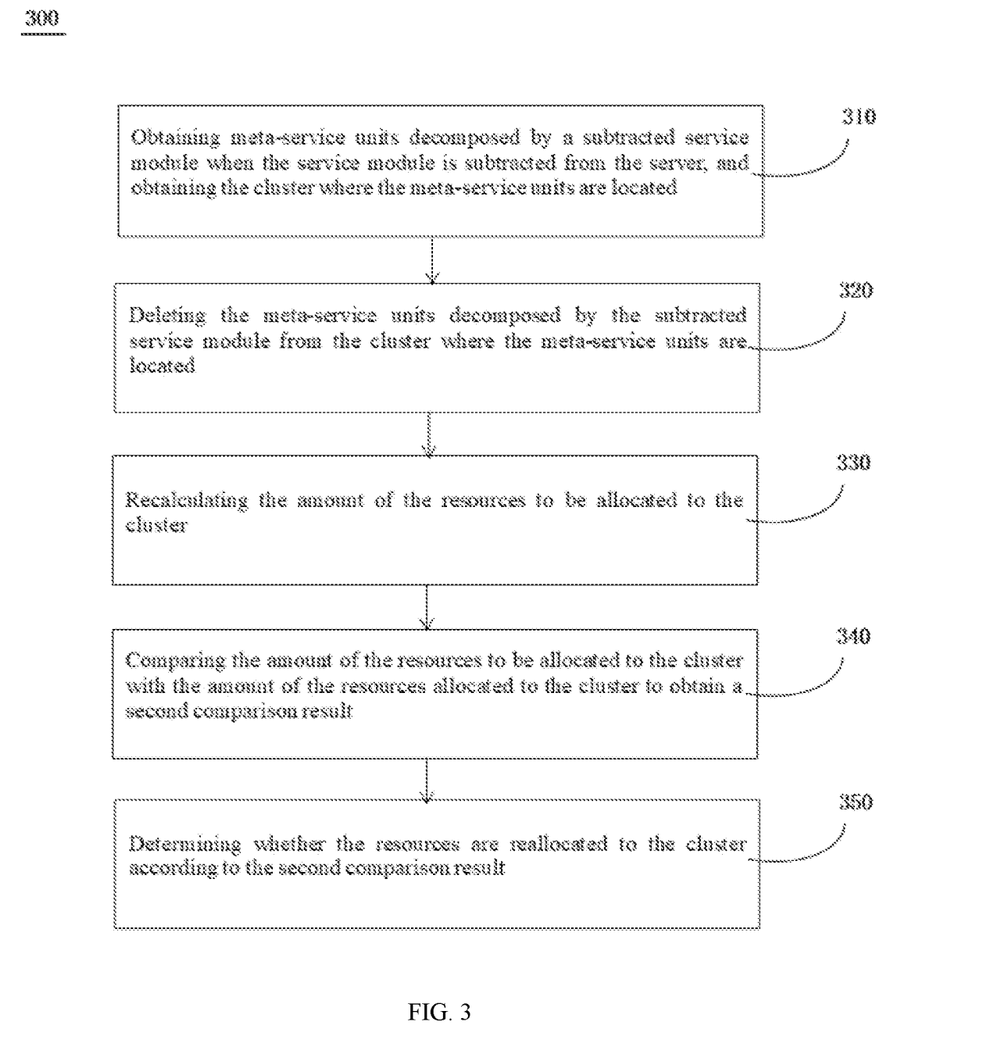
FIG. 3 is a schematic flowchart of a resource allocation method based on edge computing according to yet another embodiment of the present invention.

FIG. 3 shows a resource allocation method 300 based on edge computing according to the resource allocation method 100 based on edge computing, and the resource allocation method 300 includes the following steps.

In step 310, when the service module is subtracted from the server, the meta-service units decomposed by the subtracted service module are obtained, and the cluster where the meta-service units are located is obtained.

In step 320, the meta.-service units decomposed by the subtracted service module are deleted from the cluster where the meta-service units are located.

In step 330, the amount of the resources to be allocated to the cluster is recalculated.

In step 340, the amount of the resources to be allocated to the cluster is compared with the amount of the resources allocated to the cluster to obtain a second comparison result.

In step 350, according to the second comparison result, determining whether to reallocate the resources to the cluster.

In the embodiment of the present invention, when the service module is subtracted from the server, the meta-service units decomposed by the subtracted service module are deleted from the cluster where the meta-service units are located, and according to the change of the QoE index parameter value of the cluster, it is reasonably determined whether to reallocate the resources. Therefore, the QoE value of the user is increased, and thus the resources are more efficiently used.

Based on the above embodiment, step 350 may include:

if the second comparison result is that the amount of the resources to be allocated to the cluster is greater than the amount of the resources allocated to the cluster, reallocate the resources to the cluster.

Otherwise, no reallocation of resources is performed to the cluster.

Figure 4:
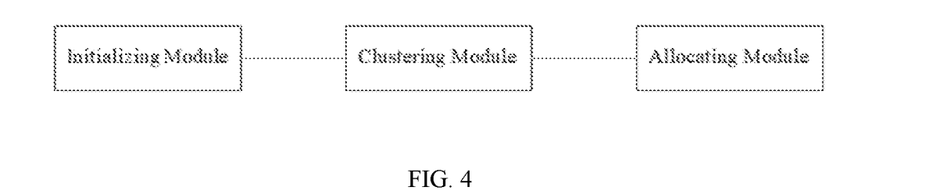
FIG. 4 is a schematic block diagram of a resource allocation apparatus based on edge computing according to an embodiment of the present invention.

As shown in FIG. 4, a resource allocation apparatus based on edge computing includes:

an initializing module configured to decompose all application systems in a server into a plurality of meta-service units according to the coupling degree between different service modules in the application systems, and obtain QoE index parameter value of each meta-service unit;

a clustering module configured to cluster the plurality of meta-service units by using a clustering algorithm based on the QoE index parameter value of each meta-service unit; and an allocating module configured to allocate resources to each cluster according to the QoE index parameter values of all meta-service units in each cluster, so that all meta-service units in each cluster share the allocated resources.

The beneficial effects of the present invention are as follows. By the decomposing module, the calculating module and the allocating module, the application systems are decomposed into the plurality of meta-service units, the QoE index parameter values of these meta-service units are obtained, the meta-service units are clustered according to the QoE index parameter values to obtain a plurality of clusters, and the resources are allocated to the clusters based on the QoE index parameter value of the clusters. Therefore, the fine-grained resource allocation is realized, the resources are allocated to the clusters with the proximate QoE parameter values, the resource allocation is more reasonable, and the QoE value of a user is increased. Thus, the resource use is more effective.

For example, a game software server terminal and a live streaming software server terminal are installed in the server. According to a data coupling degree between the service modules in the application system, the game software server terminal is decomposed into a character module, a scene module, a voice module, a map module and the like. The live streaming software server terminal is decomposed into a video acquisition module, a voice acquisition module, a beautifying module, an image processing module and a stream control module. These service modules are divided into several clusters, and the scene module, the map module and the video acquisition module which use a larger storage space are classified into one cluster. The beautifying module, the voice module, and the stream control module which have smaller requirements on the storage space and higher requirements on a bandwidth are classified into one cluster.

According to the QoE parameter values of these modules, the storage space and the bandwidth are allocated to each of these two types of clusters.

When a new special effect module is added to the game software server terminal in the server, the newly added special effect module is classified into the cluster with smaller requirements on the storage space and higher requirements on the bandwidth according to the QoE parameter value of the newly added special effect module. The storage space and the bandwidth required by such a cluster are recalculated. If the amount of the required storage space and bandwidth is less than the amount of allocated resources, no reallocation of resources is performed to the cluster.

When the beautifying module is subtracted from the live streaming software server terminal in the server, the beautifying module is deleted from the duster with smaller requirements on the storage space and higher requirements on the bandwidth, and the storage space and bandwidth required by such a cluster are recalculated. If the amount of the required storage space and bandwidth is less than the amount of allocated resources, no reallocation of resources is performed to such a cluster.

In particular, an embodiment of the present invention also provides a storage medium having an instruction stored therein, which, when being read by a computer, causes the computer to execute the resource allocation method based on edge computing in the above embodiment.

It should be understood that, in the embodiments of the present invention, the numbers of the above processes do not mean an execution sequence, and the execution order of respective processes should be determined by the function and internal logic thereof, and should not constitute any limitation to the implementation of the embodiments of the present invention.

The above description is merely a specific implementation mode of the present invention, but the scope of protection of the present invention is not limited to this. Any equivalent modification or replacement that would be readily conceived by any person skilled in the art within the scope of the technology disclosed in the present invention should be within the scope of protection of the present invention. Therefore, the scope of protection of the present invention shall be subject to the scope of protection defined by the claims.

What is claimed is:

1. A resource allocation method based on edge computing, comprising the steps of:
   decomposing all application systems in a server into a plurality of meta-service units according to the coupling degree between different service modules in the application systems, and obtaining a quality of experience (QoE) index parameter value of each meta-service unit;
   clustering the plurality of meta-service units by using a clustering algorithm based on the QoE index parameter value of each meta-service unit; and
   allocating resources to each cluster according to the QoE index parameter values of all meta-service units in each cluster, so that all meta-service units in each cluster share the allocated resources;
   wherein allocating the resources to each cluster according to the QoE index parameter values of all meta-service units in each cluster comprises:
   obtaining a QoE index parameter value of each cluster by accumulating the QoE index parameter values of all meta-service units in each cluster;
   obtaining the amount of the resources to be allocated to each cluster according to the QoE index parameter value of each cluster; and
   allocating the resources to each cluster according to the amount of the resources to be allocated to each cluster,
   wherein first meta-service units, of the plurality of meta-service units, that are within a given cluster are meta-service units of different applications installed on the server, and second meta-service units, of the plurality of meta-service units, that are part of a given application of the different applications are present in different clusters.

2. The resource allocation method based on edge computing according to claim 1, wherein the step of obtaining the amount of the resources to be allocated to each cluster according to the QoE index parameter value of each cluster comprises:
   converting the QoE index parameter value of each cluster into the amount of corresponding resources based on a corresponding relationship between the QoE index parameter value of each cluster and the amount of the corresponding resources to obtain the amount of the resources to be allocated to each cluster.

3. The resource allocation method based on edge computing according to claim 1, further comprising the steps of:
   decomposing a newly added service module into at least two meta-service units when the new service module is added to the server, and obtaining QoE index parameter values of the meta-service unit, the newly added service module comprising a newly added application system or a newly added service module in the existing application system in the server;
   classifying the meta-service unit into a corresponding cluster according to the QoE index parameter values of the meta-service units;
   recalculating the amount of the resources to be allocated to the cluster;
   comparing the amount of the resources to be allocated to the cluster with the amount of the resources allocated to the cluster to obtain a first comparison result; and
   determining whether to reallocate the resources to the cluster according to the first comparison result.

4. The resource allocation method based on edge computing according to claim 3, further comprising the step of:
   reallocating the resources to the cluster if the first comparison result is that the amount of the resources to be allocated to the cluster is greater than the amount of the resources allocated to the cluster;
   otherwise, no reallocation of the resources is performed to the cluster.

5. The resource allocation method based on edge computing according to claim 1, further comprising the steps of:
   obtaining meta-service units decomposed by a subtracted service module when the service module is subtracted from the server, and obtaining the cluster where the meta-service units are located, the subtracted service module comprising a subtracted application system or a subtracted service module of the existing application system in the server;
   deleting the meta-service units decomposed by the subtracted service module from the cluster where the meta-service units are located;
   recalculating the amount of the resources to be allocated to the cluster;
   comparing the amount of the resources to be allocated to the cluster with the amount of the resources allocated to the cluster to obtain a second comparison result; and determining whether to reallocate the resources to the cluster according to the second comparison result.

6. The resource allocation method based on edge computing according to claim 5, further comprising:

reallocating the resources to the cluster if the second comparison result is that the amount of the resources to be allocated to the cluster is greater than the amount of the resources allocated to the cluster; and otherwise, no reallocation of resources is performed to the cluster.

7. A non-transitory storage medium having an instruction stored therein, which, when being read by a computer, causes the computer to execute the resource allocation method based on edge computing according to claim 1.

* * * * *

UNITED STATES PATENT AND TRADEMARK OFFICE
CERTIFICATE OF CORRECTION

| | | |
|---|---|---|
| PATENT NO. | : 11,977,929 B2 | Page 1 of 1 |
| APPLICATION NO. | : 16/967673 | |
| DATED | : May 7, 2024 | |
| INVENTOR(S) | : Zhang et al. | |

It is certified that error appears in the above-identified patent and that said Letters Patent is hereby corrected as shown below:

On the Title Page

In item (22): "PCT Filed: Feb. 20, 2020" should be — PCT Filed: Feb. 28, 2020 —.

Signed and Sealed this
Sixteenth Day of July, 2024

Katherine Kelly Vidal
*Director of the United States Patent and Trademark Office*